(No Model.)
J. W. JOHNSON.
CHURN POWER.
No. 415,111. Patented Nov. 12, 1889.
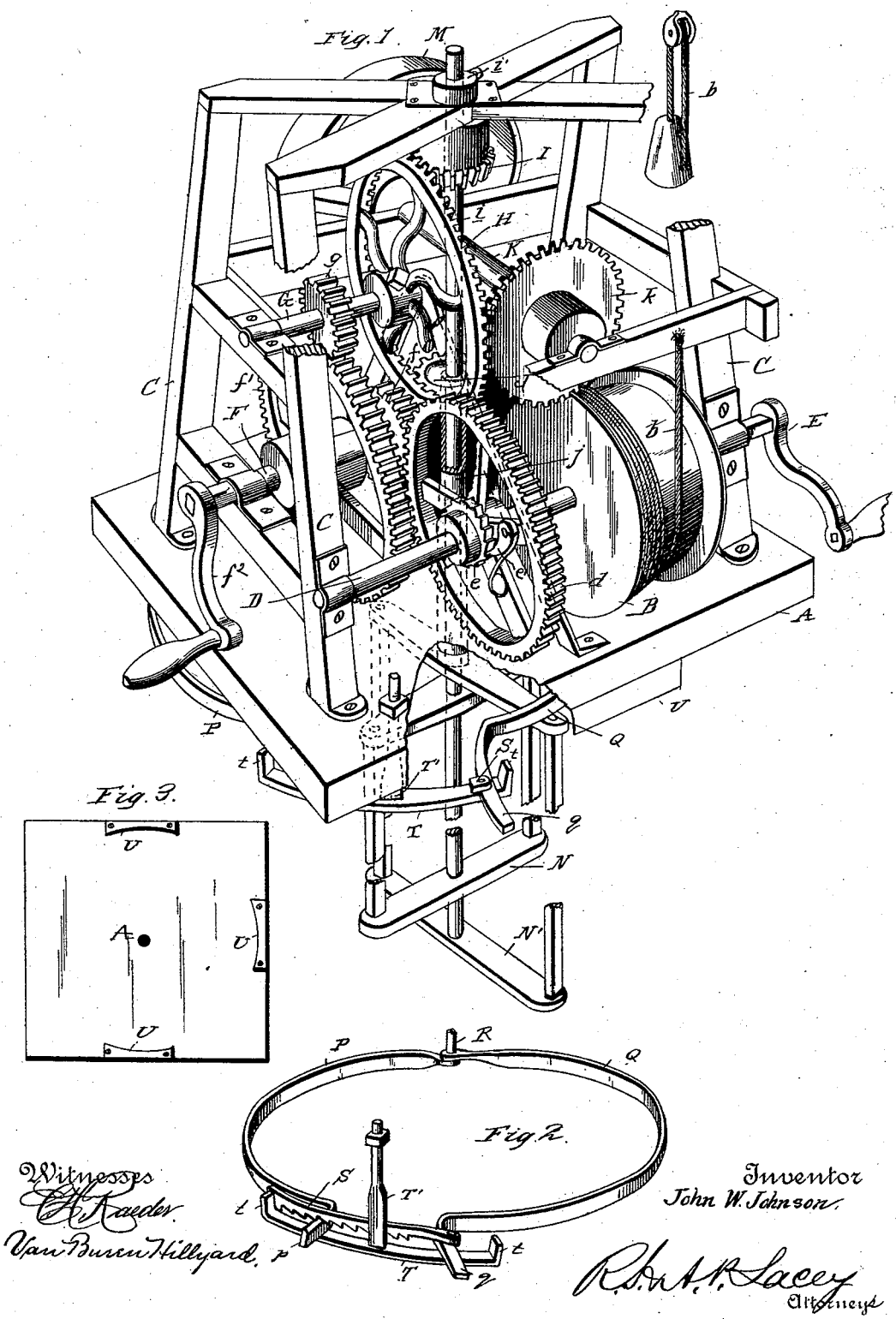
Witnesses
H. Raeder.
Van Buren Hillyard.
Inventor
John W. Johnson
R.S.&A.P. Lacey
Attorneys

UNITED STATES PATENT OFFICE.

JOHN WARREN JOHNSON, OF ST. ELIZABETH, MISSOURI.

CHURN-POWER.

SPECIFICATION forming part of Letters Patent No. 415,111, dated November 12, 1889.

Application filed March 12, 1889. Serial No. 302,967. (No model.)

*To all whom it may concern:*

Be it known that I, JOHN WARREN JOHNSON, a citizen of the United States, residing at St. Elizabeth, in the county of Miller and State of Missouri, have invented certain new and useful Improvements in Churn-Powers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to churn-powers, and aims to provide a mechanism that can be operated by hand or weight, or both, and which can be readily adjusted to different sizes of churns.

The improvement consists of the novel features, which will be hereinafter more fully described and claimed, and which are shown in the annexed drawings, in which—

Figure 1 is a perspective view, parts being broken away, of a churn-power embodying my invention; Fig. 2, a perspective view showing the means for securing the mechanism to the churn-body; Fig. 3, a bottom plan view of the base-plate on a smaller scale.

The base A, which supports the driving mechanism and has applied to its under side the devices for securing the power to the churn-body, is adapted to form the cover of the churn to which the power is fastened. The frame-work for the gearing is composed of the corner-posts C and suitable cross-bars properly disposed to support the several shafts. The windlass or drum B, on which the rope $b$, weighted at its lower end, is wound, is mounted on the shaft D. One end of this shaft is extended to receive the crank E, by which the weight is wound upon the drum. The gear-wheel $d$ on the shaft D is caused to turn therewith in one direction by the ratchet-wheel $e$ and the pawl $e'$ in the usual way. The pinion $f$ on the shaft F meshes with the gear-wheel $d$, and the gear-wheel $f'$ on the same shaft meshes with the pinion $g$ on the shaft G. One end of the shaft F is extended, and is adapted to receive the crank $f^2$, for operating the churn-dashers by hand.

The gear-wheel H on the shaft G meshes with the pinions I and J and with the pinion $k$ on the shaft K, to which the balance-wheel M is keyed. The pinion I is made fast to the dasher-shaft $i$, which is journaled vertically in the frame and supported thereon by the collar $i'$. The pinion J is secured on the tubular dasher-shaft $j$, that is concentric with the dasher-shaft $i$. The dashers N and N' are adjustable on the shafts $i$ and $j$ and revolve in reverse directions.

When the weight is wound up and the power started, the dashers N and N' will be set in motion by the gearing above described in the well-known manner. To supplement the action of the weight, the crank $f^2$ is applied to the shaft F, as hereinbefore stated; or the whole force may be applied through the crank $f^2$.

The clamp for securing the power to the churn is composed of the two curved bars or rods P and Q, which are hinged together, the post R forming the pivotal connection. The free ends of the clamping-bars are bent out at right angles, as shown at $p$ and $q$. The end $q$ is sufficiently long to form a handle to be grasped for moving the said bar and clamping it on the churn. The latch-bar S, pivoted to the handle $q$ and having a series of teeth, is adapted to engage with the bent end or projection $p$ of the bar P and hold the ends of the bars P and Q together when clamped around the neck of the churn. The supporting-bar T, for sustaining the ends of the clamping-bars, is fastened about midway of its ends to the post T', depending from the base A. The supporting-bar is curved to approximate the curvature of the clamping-bars, and its ends are bent up to form stops $tt$. The blocks U on the under side of the base center the same on the churn.

Having thus described my invention, what I claim, and desire to secure by Letters Patent, is—

In a churn-power, the combination, with the concentric shafts, each having a pinion, and the gear-wheel for driving the pinions in reverse directions, of the shaft F, adapted to receive a crank and in gear with the shaft having the said gear-wheel mounted thereon, and the power-driven shaft in mesh with and adapted to drive the said shaft F independently of the crank, substantially as described.

In testimony whereof I affix my signature in presence of two witnesses.

JOHN WARREN JOHNSON.

Witnesses:
J. H. ORTHALS,
WM. H. LEE.